March 26, 1957  C. G. KRONMILLER  2,786,924
THERMOSTATS
Filed Aug. 9, 1954  2 Sheets-Sheet 1
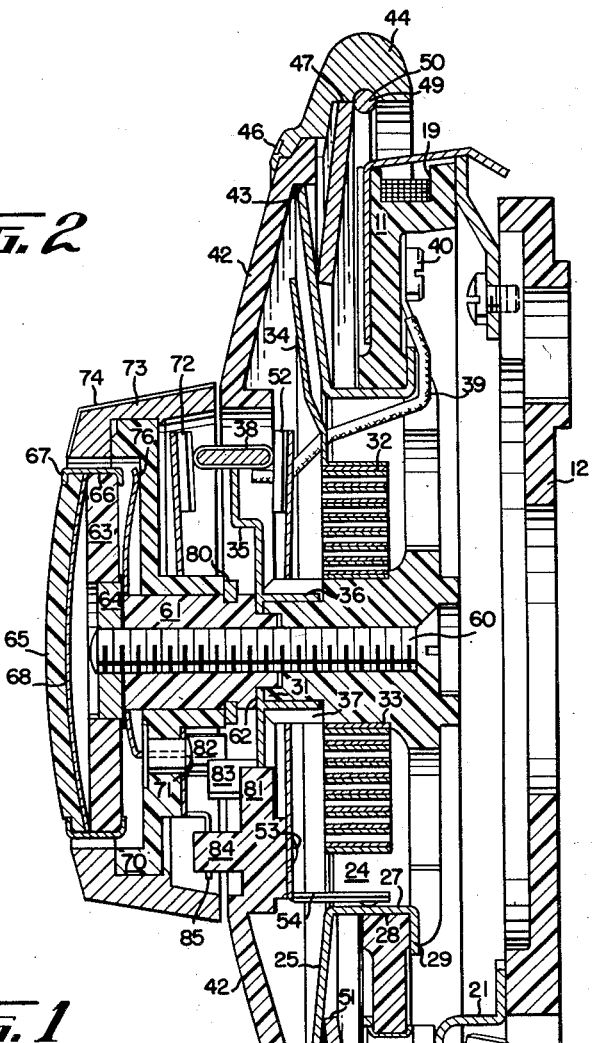
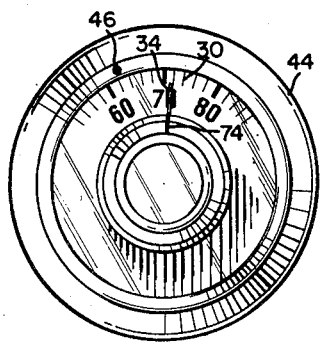
INVENTOR
CARL G. KRONMILLER
BY *George H Fisher*
ATTORNEY March 26, 1957 C. G. KRONMILLER 2,786,924
THERMOSTATS
Filed Aug. 9, 1954 2 Sheets-Sheet 2

United States Patent Office 2,786,924
Patented Mar. 26, 1957

2,786,924

THERMOSTATS

Carl G. Kronmiller, Minneapolis, Minn., assignor to Minneapolis-Honeywell Regulator Company, Minneapolis, Minn., a corporation of Delaware Application August 9, 1954, Serial No. 448,547

10 Claims. (Cl. 201—48)

This invention relates to thermostats and more particularly to room thermostats of the type in which the sensing element is an electrical resistance element made of a material the resistance of which changes on changes in temperature.

My invention enables both the sensing element and the adjusting means therefor to be incorporated in a very small space. In the illustrative embodiment of the invention a resistance type thermostat provided with both day and night control point adjustments is enclosed in a round casing having a diameter of less than 2½ inches. A scale plate having a diameter commensurate with the over-all diameter permits the incorporation of a large and easily read temperature setting and indicating scale notwithstanding the small over-all diameter. In order to attain the small size, the time switch for shifting between the day and night temperatures as selected on the thermostat is remotely located.

An object of my invention is to provide a thermostat of unobtrusive but attractive appearance.

Another object of my invention is to provide a round style thermostat of very small diameter.

A further object of my invention is to provide a small and attractive thermostat with a large scale that is easy to read.

Other objects will appear from the written description and claims and from the drawing in which:

Figure 1 is an elevation showing the external appearance of a thermostat of one embodiment of my invention, as disclosed in Dreyfuss application Serial No. D. 28,972, filed February 11, 1954;

Figure 2 is a cross sectional elevation of the instrument of Figure 1;

Figure 3 is an exploded perspective of the thermostat of Figures 1 and 2 as seen from one side and from the rear of the thermostat; and Figure 4 is a wiring diagram of the device of Figures 1 and 2 together with the electrical connection of the change-over switch and clock which are not included in the device of Figures 2 and 3.

The device to be described comprises a temperature responsive element connected in series with a nontemperature responsive resistance which is provided with two adjustable taps, one of which may be said to include more resistance in series with the temperature responsive resistance than the other. The device may be connected in one leg of a bridge circuit which will be in balance only when the sum of the temperature responsive resistance and the nonresponsive resistance to the selected tap is at a predetermined value. Thus if the effective tap is at a point including little resistance, total resistance is attained only by relatively high temperature of the temperature responsive resistance.

As shown in the drawings the device is provided with a circular base 11 of dielectric material which is mounted on a wall plate 12 of dielectric material and secured thereto by brackets 13 and 14 and screw 15 all of electrically conductive material. The wall plate 12 is provided with suitable apertures for mounting screws and wiring. Three terminal screws on the wall plate are electrically connected to the brackets 13 and 14 and screw 15 when in assembled relation. A temperature responsive resistance 18 is wound in a groove 19 in the periphery of base member 11. One end of temperature responsive resistance 18 is soldered to bracket 20 on base member 11. Screw 15 engages screw threads in terminal 21 on wall plate 12 and in assembled relation makes physical and electrical contact with bracket 20 on base member 11.

The base member 11 has a plurality of uniformly spaced apertures 24 formed therein near its center as shown in Figure 3. A circular scale plate 25 with a circular aperture 26 in its center portion is mounted on base member 11. Scale plate 25 is generally conical and has a cylindrical portion 27 formed at the aperture 26 that engages cylindrical surface 28 on base member 11. A plurality of tabs 29 extending from the cylindrical portion 27 of scale plate 25 extend through the apertures 24 in base member 11 and are bent back on the base member 11 attaching scale plate 25 to base member 11. Scale plate 25 has indicia of temperature 30 thereon. A central post 31 extends from the center portion of base member 11 and is formed integrally therewith. A spiral bimetal thermometer 32 is mounted on a cylindrical surface 33 of central post 31 in base member 11 and has an indicating arm 34 attached to the spiral portion of bimetal thermometer 32 that cooperates with the indicia of temperature 30 on scale plate 25 to indicate existing temperature. A bracket 35 has a pair of ears 36 that engage notches 37 on central post 31 of base member 11. An arcuate elongated resistance element 38 is mounted on bracket 35 and has an electrical connection to the temperature responsive resistance 18 through a pigtail 39, one end of which is soldered to one end of resistance element 38, the other end to a terminal 40 on base member 11. One end of temperature responsive resistance 18 is soldered to bracket 20 on the periphery of base member 11 and the other end is soldered to terminal 40 on base member 11 which as mentioned above is connected to the nontemperature responsive resistance 38.

A circular member 42 of crystal or transparent material has a cylindrical bearing surface 43 that engages the circular periphery of scale plate 25. A circular member 44 is mounted on circular member 42 and keyed thereto at 45 as shown in Figure 3. An index 46 on circular member 44 cooperates with indicia of temperature 30 on scale plate 25 and indicates the position of slider 52 on resistance 38. The outer periphery 47 of a friction washer 48 engages circular member 44 and is held in position by a snap ring 49 in a groove 50 in circular member 44. Arcuate portions 51 of friction washer 48 bear on the backside of scale plate 25. The scale plate 25 which is secured to the base 11 provides the bearing on which the transparent member 42 and circular member 44 are pivotally mounted. Radial displacement of these members is prevented by the cylindrical surface 43 while axial displacement is prevented by the rear surface of transparent member 42 at its outer extremity by friction washer 48 engaging the curved surface of the scale plate.

A slider 52 that is riveted to transparent member 42 by rivets 53, cooperates with one side of resistance element 38 and has extensions 54 which contact the cylindrical portion 27 of scale plate 25. A tab 56 shown in Figure 3 extending from the cylindrical portion 27 on scale plate 25 extends through an aperture 57 shown in Figure 3 in base member 11 and soldered to bracket 13 thereon that makes electrical contact with terminal 58 on wall plate 12.

A screw 60 extends through the central post 31 of base member 11. A second central post 61 is carried by screw 60 and keyed to central post 31 by engaging a non-circular aperture 62 in bracket 35 so that it will not rotate with respect to base member 11. The outer end of post member 61 is in the form of a disc 63. A threaded insert 64 of conductive material is keyed into the disc end 63 of central post 61 and engages the threads on screw 60. A small crystal member 65 is clamped to the disc 63 of central post 61 at 66 by a bezel 67. A disc 68 clamped between the small crystal member 65 and the disc end 63 of central post 61 may carry an appropriate monogram.

A rotatable member 70 is pivotally mounted on central post 61 and has riveted thereto by rivets 71 a slider 72 that cooperates with the opposite side of resistance element 38. A circular member 73 is mounted on rotatable member 70 and carries an index 74 that cooperates with the indicia of temperature 30 of scale plate 25. Member 73 may be keyed or otherwise suitably secured to member 70 to maintain the fixed angular relationship. There is an electrical connection from slider 72 through the hollow rivets 71 to a spring washer 76 which bears on threaded insert 64 and has extensions 77 shown in Figure 3 which are soldered to rivets 71. Screw 60 makes electrical contact with a strap 78 shown in Figure 3 that is soldered to bracket 14 on base member 11 which makes electrical contact with terminal 79 on wall plate 12. Spring washer 76 also biases rotatable member 70 axially against snap ring 80 carried on post 61. The index 74 on the circular member 73 cooperates with the indicia of temperature 30 of scale plate 25 as shown on Figure 1 and indicates the position of slider 72 on resistance 38.

Abutment 81 as shown in Figure 3 on transparent member 42 and abutment 82 as shown in Figure 3 on rotatable member 70 cooperate with abutments 83 as shown on Figure 3 on bracket 35 to limit the over-all movement of sliders 52 and 72 on resistance element 38. Abutment 84 as shown on Figure 3 on transparent member 42 and car 85 as shown in Figure 3 cooperate to prevent the night setting as indicated by index 46 being set higher than the day setting as indicated by index 74. When abutments 84 and 85 are in contact there would be substantially zero resistance between sliders 52 and 72.

Reference is made to Stanley W. Nickells Patent No. 2,626,379 which discloses a similar arrangement wherein two sliders disposed on opposite sides of a resistance element may be manually adjusted to select day and night temperature control points.

Referring now to Figure 4 in which the electrical connections to the change-over switch and clock are shown. The terminal 21 is electrically connected to one end of temperature responsive element 18, the other end of which is electrically connected in series to one end of nontemperature responsive resistance element 38. Slider 72 as positioned by circular member 73 cooperates with resistance element 38 such that an equal or smaller portion of resistance element 38 is in series with temperature responsive element 18 than is in series with temperature responsive element 18 through the cooperation of slider 52 as positioned by circular member 44 with resistance element 38. Slider 72 is electrically connected to terminal 79 and slider 52 is electrically connected to terminal 58. A switch 86 is electrically connected across terminals 58 and 79 and operated by a clock 87 through a cam (not shown). The sensing element as shown in Figure 4 is then used as one leg of a bridge network (not shown) its terminals being 88 and 89. When switch 86 is closed the circuit through slider 52 and terminal 58 is shorted out due to the equal or smaller resistance through terminal 79 and slider 72. When switch 86 is open it is obvious that the circuit from 89 to 88 can only be completed through slider 52 and terminal 58.

Various changes obviously can be made to describe embodiments of the invention without departing from the basic inventive concept. For example, if night setback is not desired the slider 72 and accompanying adjustment mechanism could be eliminated. Also transparent member 42 need not necessarily bear on the circular periphery of scale plate 25. Scale plate 25 could be other than circular with arcuate portions to provide a bearing surface for transparent member 42. The scope of the invention is to be limited only by the inventive claims.

I claim as my invention:

1. In a thermostat a circular base member, a temperature responsive resistance element carried in a groove on the periphery of said circular base member, a circular scale plate bearing indicia of temperature mounted on said base member, a member carried by the circular periphery of said scale plate and rotatable thereon, said member having a transparent portion overlying the indicia on said scale plate, an index on said member cooperating with said scale plate indicia to indicate control point, an arcuate resistance element carried by said base, a slider carried by said member and cooperating with said arcuate resistance, means connecting said temperature responsive resistance element electrically in series with the adjustable resistance comprising said arcuate resistance element and said slider.

2. In a thermostat, a base comprising a continuous generally circular peripheral portion and a center part connected to the peripheral portion by a plurality of bridging portions, a temperature responsive means carried on said base member, an annular scale plate bearing indicia of temperature mounted on said base member, a spiral bimetal thermometer on said central post of said base member, said bimetal thermometer overlying said bridging portion and extending radially outward to cooperate with said scale plate indicia, a first and second adjusting means for said temperature responsive means, said first and second adjusting means carried on said central part of said base member, a first member carried by the circular periphery of said scale plate and rotatable thereon, said first member having a transparent portion overlying the indicia on said scale plate, an index on said first member cooperating with said scale plate indicia to indicate a first control point, a second rotatable member carried by said central part of said base member, an index on said second member cooperating with said scale plate indicia to indicate a second control point, said first adjusting means being positioned by angular adjustment of said first member on said scale plate and said second adjusting means positioned by angular adjustment of said second member.

3. In a thermostat, a base member with a circular periphery, indicia of temperature on said base member, a bimetal thermometer on said base member cooperating with said indicia of temperature, a temperature sensitive means carried by said base member, an adjusting means for said temperature sensitive means carried by said base member, a member carried by the circular periphery of said base member and rotatable thereon, an index on said member cooperating with said indicia of temperature on said base member, said adjusting means being positioned by angular adjustment of said member, said member extending radially beyond said base member in all directions.

4. In a thermostat, a base member, a temperature responsive means carried on said base member, a scale plate bearing indicia of temperature mounted on said base member, said scale plate having an arcuate bearing portion, an adjusting means for said temperature responsive means, a member carried by the arcuate bearing portion of said scale plate and movable thereon, an index on said member cooperating with said scale plate indicia to indicate control point, said adjusting means being positioned by angular adjustment of said member on said scale plate.

5. In a thermostat, a base member, a temperature responsive means carried on said base member, a scale plate bearing indicia of temperature mounted on said base member, said scale plate having a circular periphery, an adjusting means for said temperature responsive means, a member carried by the circular periphery of said scale plate and rotatable thereon, said member having a transparent portion overlying the indicia on said scale plate, an index on said member cooperating with said scale plate indicia to indicate control point, said adjusting means being positioned by angular adjustment of said member on said scale plate.

6. In a thermostat, a base member, a temperature responsive means carried on said base member, a scale plate bearing indicia of temperature mounted on said base member, said scale plate having a circular periphery, a bimetal thermometer on said base member cooperating with said scale plate indicia, a first and second adjusting means for said temperature responsive means, a first member carried by the circular periphery of said scale plate and rotatable thereon, said first member having a transparent portion overlying the indicia on said scale plate, an index on said first member cooperating with said scale plate indicia to indicate a first control point, a second rotatable member carried by said base and adjustable about the same axis as said first member, an index on said second member cooperating with said scale plate indicia to indicate a second control point, said first adjusting means being positioned by angular adjustment of said first member on said scale plate and said second adjusting means positioned by angular adjustment of said second member.

7. In a thermostat, a base member, a temperature responsive means carried on said base member, a scale plate bearing indicia of temperature mounted on said base member, said scale plate having a circular periphery, a bimetal thermometer on said base member cooperating with said scale plate indicia, an adjusting means for said temperature responsive means, a member carried by the circular periphery of said scale plate and rotatable thereon, the bearing between the circular periphery of said scale plate and said member positioning said member relative to said scale plate radially, the member and said scale plate abutting to position said member and said scale plate in one direction axially, a friction washer the inner circumference bearing on said scale plate and the periphery abutting said member to position said member and said scale plate in the opposite direction axially, said member having a transparent portion overlying the indicia on said scale plate, an index on said member cooperating with said scale plate indicia to indicate control point, said adjusting means being positioned by angular adjustment of said member on said scale plate.

8. In a thermostat, a circular base member, a temperature responsive resistance carried on said base member, an electrical connection between said temperature responsive resistance and a first terminal on said base member, a plurality of apertures radially disposed in said base member removed from the center portion of said base member, a circular scale plate bearing indicia of temperature mounted on said base member, a circular aperture in the center of said scale plate with a plurality of tabs formed thereon, said tabs protruding through said apertures and bent back upon said base member forming the means of mounting said scale plate on said base member, a bimetal thermometer on said base member cooperating with said scale plate indicia, a bracket on said base member, an elongated resistance element on said bracket, an electrical connection between said resistance element and said temperature responsive resistance, a second circular member bearing on the circumference of said scale plate and rotatable about it, the center portion of said second circular member being transparent to allow reading of the scale plate indicia, a friction washer one end positioned by said second circular member the other end bearing on the back of said scale plate and further defining the relative position of said second circular member to said scale plate, a slider attached to said second circular member and cooperating with one side of said resistance element, an electrical connection between said slider and a second terminal, an index carried by said second circular member cooperating with said scale plate indicia, a screw through the center of said base member and projecting therefrom, a third member on the projecting end of said screw, a rotatable member bearing on said third member, a second slider on said rotatable member cooperating with the opposite side of said resistance member, an electrical connection between said second slider and a third terminal, a knob on said rotatable member carrying an index cooperating with said scale plate indicia, said second circular member and said rotatable member positioning said first and second sliders to indicate control points of said thermostat.

9. A control device comprising, a base member, a member rotatable relative to said base member, temperature responsive control means the control point of which is adjusted by movement of said rotatable member relative to said base member, a scale plate disposed transversely of the pivotal axis carried by said base member and having indicia of temperature thereon arcuately disposed about the pivotal axis, an index on said rotatable member cooperating with said indicia, and temperature indicating means including a sensing element carried by said base member and a pointer positioned thereby to move arcuately about the pivotal axis of said rotatable member and cooperating with said indicia to indicate ambient temperature.

10. A control device consisting of first and second members relatively rotatable on a pivotal axis, temperature responsive control means the control point of which is adjusted by relative rotation of said members, a scale plate disposed transversely of the pivotal axis carried by one of said members and having indicia of temperature thereon arcuately disposed about the pivotal axis, an index on the other of said members cooperating with said indicia, mounting means supporting the one of said members which carries said scale plate, a spiral bimetal carried at one of its ends on the one of said members which carries said scale plate, said bimetal being coaxially disposed with respect to the pivotal axis of said members, and a pointer on the other end of said spiral bimetal arcuately movable with respect to the pivotal axis of said members and cooperating with said indicia to indicate ambient temperature.

References Cited in the file of this patent

UNITED STATES PATENTS 2,593,351    Shannon _____ Apr. 15, 1952